United States Patent
Zhang et al.

(10) Patent No.: US 7,917,182 B2
(45) Date of Patent: Mar. 29, 2011

(54) METHOD FOR AUTOMATICALLY SWITCHING SCENE MODE AND PORTABLE TERMINAL USING THE SAME

(75) Inventors: Xiaoping Zhang, Beijing (CN); Zhepeng Wang, Beijing (CN)

(73) Assignee: Lenovo (Beijing) Limited, Beijing (CN)

(*) Notice: Subject to any disclaimer, the term of this patent is extended or adjusted under 35 U.S.C. 154(b) by 813 days.

(21) Appl. No.: 11/843,003

(22) Filed: Aug. 22, 2007

(65) Prior Publication Data
US 2008/0051035 A1 Feb. 28, 2008

(30) Foreign Application Priority Data
Aug. 23, 2006 (CN) .................... 2006 1 0112546

(51) Int. Cl.
*H04B 1/38* (2006.01)
(52) U.S. Cl. ............... 455/567; 455/445; 455/456.4; 455/550.1; 455/401; 455/415
(58) Field of Classification Search ........... 455/567, 455/456.4, 550.1, 445, 401, 415
See application file for complete search history.

(56) References Cited

U.S. PATENT DOCUMENTS

| 6,272,319 B1 | 8/2001 | Narusawa |
| 6,934,536 B2 | 8/2005 | Yoshioka |
| 2004/0127197 A1* | 7/2004 | Roskind ................ 455/412.2 |
| 2005/0136842 A1 | 6/2005 | Fan et al. |
| 2005/0276407 A1 | 12/2005 | Mohler |

FOREIGN PATENT DOCUMENTS

| JP | 07-032405 A | 2/1995 |
| JP | 11-205837 A | 7/1999 |
| JP | 2001-189774 A | 7/2001 |
| JP | 2002-111569 A | 4/2002 |
| JP | 2004-336166 A | 11/2004 |
| JP | 2005-354667 A | 12/2005 |
| JP | 2006-115278 A | 4/2006 |

* cited by examiner

*Primary Examiner* — Nghi H Ly
(74) *Attorney, Agent, or Firm* — Dickstein Shapiro LLP

(57) ABSTRACT

A method for automatically switching scene mode and a portable terminal are disclosed, the method comprises steps of setting life cycle and subsequent scene mode for each scene mode; judging whether the life cycle of current scene mode has ended; and switching the current scene mode to a subsequent scene mode if it is judged that the life cycle of the current scene mode has ended. With the present invention, a user can define desired scene modes at different moments during a day depending on his daily arrangement, and thus this brings great convenience to the user.

8 Claims, 2 Drawing Sheets

| NO. | TYPE | START TIME | END TIME | PRIORITY | SUBSEQUENT PREFERENCE |
|---|---|---|---|---|---|
| 1 | RING MODE | 6:00 | 9:00 | 2 | DEFAULT MODE |
| 2 | MEETING MODE | 9:00 | 11:00 | 1 | RING MODE |
| ... | ... | ... | ... | ... | ... |
| N | IN-VEHICLE | 17:00 | 17:30 | 3 | RING MODE |

METHOD FOR AUTOMATICALLY SWITCHING SCENE MODE AND PORTABLE TERMINAL USING THE SAME

BACKGROUND OF THE INVENTION

1. Field of Invention

The present invention relates to a portable terminal, and more particularly to a method for automatically switching scene mode and a portable terminal using the same.

2. Description of Prior Art

At present, many portable devices, such as mobile phones, can support the switching of scene mode. For example, the current scene mode can be switched to silence mode at the time of a meeting. Although such scene-switching function brings considerable convenience to a user, it requires a manual setting by the user.

Patent Document 1 (US 20050136842) proposes a method which can automatically switch scene mode for a mobile phone depending on variation in surrounding noise. In the Patent Document 1, the value of noise from around the mobile phone is first measured, and then the measured noise value is compared with a predetermined reference value to calculate the difference between them. Subsequently, it is determined whether to switch the current scene mode of the mobile phone based on the noise difference.

Only when surrounding noise varies, the method for switching scene mode provided in the above Patent Document 1 switches scene mode for the mobile phone at any time so as not to miss an incoming call. This method, however, cannot deal with the problem that an automatic switching of scene mode is required in the case of slight variation occurring in surrounding noise.

For instance, if a user forgets to set his mobile phone to silence mode before his meeting, when there is an incoming call during the meeting, the call will interfere with the meeting. Alternatively, a user often forget to cancel the silence setting after his meeting if he has set his mobile phone to silence mode during the meeting, thus the user is prone to miss some important phone calls, short messages or emails.

The above-mentioned problems cause inconvenience to a user using his portable terminal. Therefore, it is desired that a potable terminal can automatically switch scene mode at a proper moment and thereby improve its operation performance.

SUMMARY OF THE INVENTION

In view of the above problems in the prior art, the present invention is realized. It is an object of the invention to provide a method for automatically switching scene mode and a portable terminal using the same, so as to improve the operation performance of the portable terminal.

According to one aspect of the present invention, a method for automatically switching scene mode is provided, which comprises steps of setting life cycle and subsequent scene mode for each scene mode; judging whether the life cycle of current scene mode has ended; and switching the current scene mode to a subsequent scene mode if it is judged that the life cycle of the current scene mode has ended.

According to an embodiment of the present invention, said life cycle and subsequent scene mode of the current scene mode are manually set by a user.

According to an embodiment of the present invention, said life cycle and subsequent scene mode of the current scene mode are generated from a schedule based on a predetermined rule.

According to an embodiment of the present invention, said schedule is a schedule provided in a portable terminal.

According to an embodiment of the present invention, said schedule is a schedule provided in mail system of a computer.

According to an embodiment of the present invention, said subsequent scene mode is a default scene mode.

According to another aspect of the present invention, a portable terminal is provided, which comprises a scene mode information store which stores scene mode information representing scene mode arrangement, wherein the scene mode information includes at least the type, life cycle and subsequent scene mode of a scene mode, and a switching means which judges whether the life cycle of current scene mode has ended and for switching the current scene mode to a subsequent scene mode if it is judged that the life cycle of the current scene mode has ended.

According to an embodiment of the present invention, said portable terminal further comprises a timer, and said switching means judges whether said life cycle has ended based on the current time by said timer.

According to an embodiment of the present invention, said life cycle and subsequent scene mode of the current scene mode are manually set by a user through a scene mode setting interface.

According to an embodiment of the present invention, said portable terminal further comprises a converter which generates said life cycle and subsequent scene mode of the current scene mode from a schedule provided in said portable terminal based on a predetermined rule.

According to an embodiment of the present invention, said subsequent scene mode is a default scene mode.

According to a further aspect of the present invention, a mail system is provided, which comprises a schedule which contains daily arrangement for a user, a converter which generates the type, life cycle and subsequent scene mode of a scene mode from said schedule based on a predetermined rule.

According to an embodiment of the present invention, said type, life cycle and subsequent scene mode of the scene mode are stored in a portable terminal via wired or wireless connection.

According to a further aspect of the present invention, a communication system is provided, which comprises a portable terminal including a scene mode information store which stores scene mode information representing scene mode arrangement, wherein the scene mode information includes at least the type, life cycle and subsequent scene mode of a scene mode, and a switching means which judges whether the life cycle of current scene mode has ended and switches the current scene mode to a subsequent scene mode if it is judged that the life cycle of the current scene mode has ended; a host provided with a mail system and connected communicable to said portable terminal, wherein said maid system comprises a schedule containing daily arrangement for a user; and a converter which generates the type, life cycle and subsequent scene mode of a scene mode from said schedule based on a predetermined rule.

With the above configuration of the present invention, a user can define desired scene modes at different moments during a day depending on his daily arrangement, and thus this brings great convenience to the user.

BRIEF DESCRIPTION OF THE DRAWINGS

The embodiments of the present invention will be described by way of examples and not limited to the illustra

DETAILED DESCRIPTION OF THE PREFERRED EMBODIMENTS

Many specific details will be given in the following description to ensure a complete and thorough understanding of the inventive examples. For those ordinary skilled in the art, however, it can be understand that the embodiments of the present invention can be carried out even without these specific details. In addition, a concrete description is not made to well-known methods, processes, components and circuits so as not to obscure the implementation of the present invention.

Figures 1, 2:
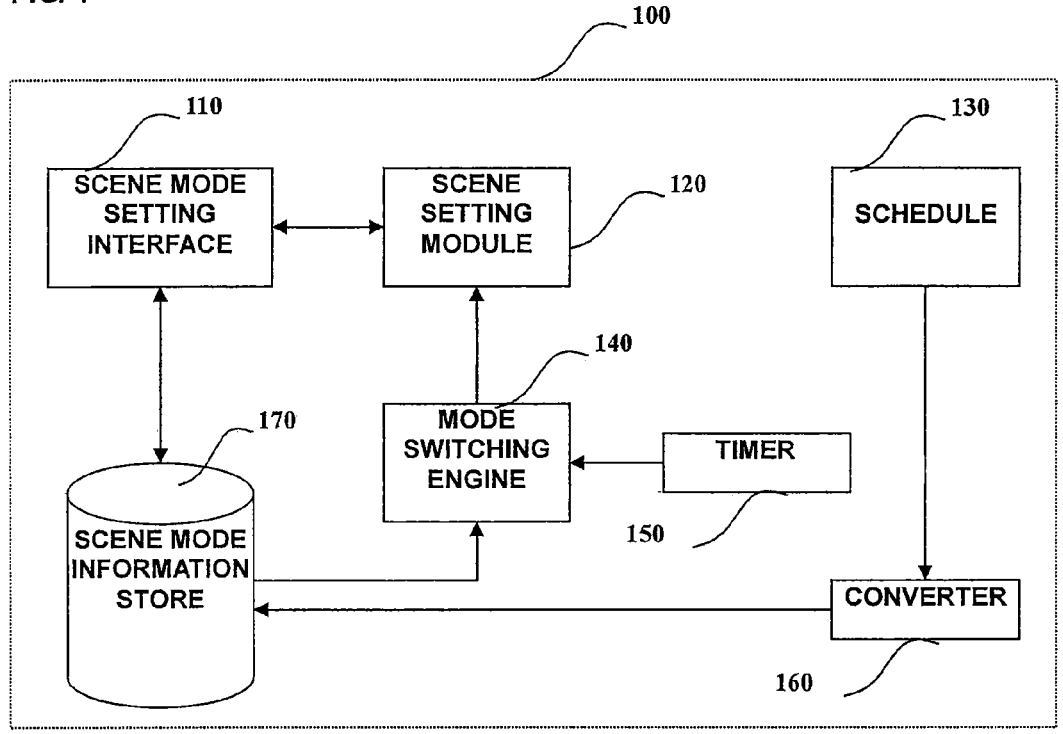
- FIG. 1 shows a block diagram of a portable terminal according to the first embodiment of the present invention.
FIG. 2 shows scene mode information stored in the scene mode information store shown in FIG. 1.

FIG. 1 shows a block diagram of a portable terminal according to the first embodiment of the present invention.

As shown in FIG. 1, the portable terminal 100 according to the first embodiment of the present invention comprises a schedule 130 which records tasks to be fulfilled by a user in respective periods during a day, a converter 130 which converts specific arrangement stored in the schedule 130 into scene mode information according to a predetermined rule, a scene mode information store 170 which stores scene mode information, a mode switching engine 140 which switches scene mode for the mobile phone at each corresponding moment according to the scene mode information stored in the scene mode information store 170, a timer 150, a scene setting module 120 which provides a scene mode setting interface 110, and the scene mode setting interface 110.

The scene mode setting interface 110 provided by the scene setting module 120 is utilized to interface with a user. The user can set the life cycle, priority and subsequent mode, etc. through the scene setting interface 110.

Information about each scene mode to be set is stored in the scene mode information store 170 and includes the type, start time, end time, priority and subsequent preference mode, etc. FIG. 2 shows an example for the scene mode information stored in the scene mode information store shown in FIG. 1.

The mode switching engine 140 reads out the arrangement for scene mode from the scene mode information store 170 and utilizes the scene setting module 120 to switch the scene mode of the mobile phone to a specified scene mode at a designated moment.

As described above, in the prior art, the scene mode of a mobile phone cannot be changed as long as it has been set, unless it is switched manually again by a user. On the contrary, according to the first embodiment, since duration and subsequent preference mode have been contained in the scene mode information, the mode switching engine 140 is enable to determine the end time of current scene mode based on the time provided by the timer 150 and switch automatically the current scene mode to the subsequent preference mode contained in the scene mode information at the end time of the current scene mode, that is, once the life cycle of some scene mode has reached a preset duration, the scene mode comes to an automatic ending, and simultaneously its subsequent scene mode is set as current one. A default scene mode is used in the case that a subsequent preference mode is not set.

Furthermore, the scene mode information in the scene mode information store 170 can be either the information set and stored through the scene mode setting interface or that obtained from conversion based on the daily arrangement in the schedule 130 by the converter 160. For example, the converter 160 can convert the daily arrangement '15:00~17:00 attend a meeting' into 'meeting mode, begin at 15:00, duration of 2 hours, default mode as subsequent mode' and then stores the converted information in the scene mode information bank 170.

As mentioned above, the present invention refines the existing absolute scene mode switching mechanism by way of a dynamic and customizable switching mechanism, in which customization can have several modes as follows.

While switching to a new scene mode, the user is required to specify the scene mode switched to and the length of time during which he expects to maintain the scene mode. The maintaining period can be defined by a period of specified length or by reaching a specified time or a specified event (e.g. next scene switching by the user).

Further, the above mode switching engine 140 performs an automatic scene switching at the time preset by the user based on the time of the timer 150 and the life cycle of the current scene mode, and the mobile device is switched to standard scene mode, the previous one or the one specified by the user.

Therefore, in the present invention, the user can either employ an editor to define directly the desired scene modes of his mobile phone for different periods during a day or predefine configuration files to store the scene mode mechanisms commonly used by him, so the user can employ different configuration files under various circumstances. For example, while setting the event arrangement in the schedule, the user can set the scene mode of the mobile phone corresponding to the occurrence of each event. It is obvious that the user can also employ an automatic mode and set different default scene modes of the mobile phone for various events in the schedule.

Figure 3:
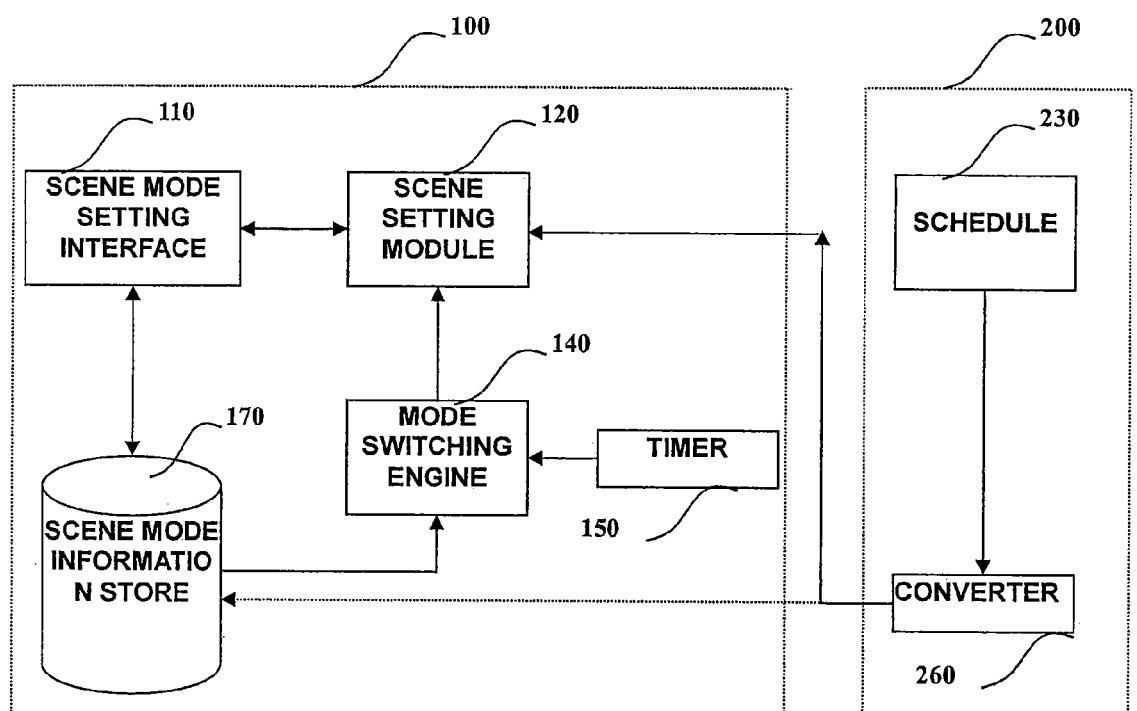
FIG. 3 shows a block diagram of a portable terminal according to the second embodiment of the present invention.

FIG. 3 shows a block diagram of a portable terminal according to the second embodiment of the present invention.

As shown in FIG. 3, a portable terminal 100 according to the second embodiment is associated with the mail system of a computer through an interface.

The portable terminal 100 according to the second embodiment differs from the first embodiment in that the schedule 130 and the converter 160 are replaced with a schedule 230 and a converter 260 provided in the mail system 200 of the computer.

In this case, if the user needs to set the scene mode of the mobile phone by using the schedule in the computer, he can register the mobile phone on the computer through a USB interface or a wireless interface.

Next, the converter 260 reads daily arrangement from the schedule 230 in the computer, interpreters the read daily arrangement into scene mode information including, for example, scene mode type, start time, end time, priority and subsequent preference mode and the like based on a predetermined rule and stores the information in the scene mode information bank 170 in the mobile phone.

In this way, it is required for the user to set daily arrangement in the computer only once, the setting can be shared on the mobile phone. This brings considerable convenience to the user's operation.

The above description is only the specific implementation of the present invention, and the scope of the invention is not limited thereto. The scope of invention is intended to cover all modifications and substitutions readily conceivable by those skilled in the art and thus should be defined in the appended claims.

What is claimed is:

1. A method for automatically switching scene mode comprising steps of:
    setting scene mode information including at least scene mode type, life cycle and subsequent scene mode for each scene mode;
    judging whether the life cycle of current scene mode has ended; and
    switching the current scene mode to a subsequent scene mode if it is judged that the life cycle of the current scene mode has ended;
    wherein said life cycle and subsequent scene mode of the current scene mode are generated from a schedule provided in a mail system based on a predetermined rule schedule.

2. The method according to claim 1, wherein said schedule is a schedule provided in the mail system of a computer or a portable terminal.

3. The method according to claim 1, wherein said subsequent scene mode is a default scene mode.

4. A portable terminal comprising:
    a scene mode information store which stores scene mode information representing scene mode arrangement, wherein the scene mode information includes at least the type, life cycle and subsequent scene mode of a scene mode,
    a mail system comprising: a schedule which contains daily arrangement for a user, and a converter which generates the type, life cycle and subsequent scene mode of a scene mode from said schedule based on a predetermined rule, and
    a switching means which judges whether the life cycle of current scene mode has ended and for switching the current scene mode to a subsequent scene mode if it is judged that the life cycle of the current scene mode has ended.

5. The portable terminal according to claim 4, wherein said portable terminal further comprises a timer, and said switching means judges whether said life cycle has ended based on the current time by said timer.

6. The portable terminal according to claim 4, wherein said subsequent scene mode is a default scene mode.

7. A communication system comprising:
    a portable terminal including a scene mode information store which stores scene mode information representing scene mode arrangement, wherein the scene mode information includes at least the type, life cycle and subsequent scene mode of a scene mode, and
    a switching means which judges whether the life cycle of current scene mode has ended and switches the current scene mode to a subsequent scene mode if it is judged that the life cycle of the current scene mode has ended; and
    a host provided with a mail system and connected communicable to said portable terminal,
    wherein said mail system comprises a schedule which contains daily arrangement for a user;
    and a converter which generates the type, life cycle and subsequent scene mode of a scene mode from said schedule based on a predetermined rule.

8. The communication system according to claim 7, wherein said type, life cycle and subsequent scene mode of the scene mode are stored in the portable terminal via wired or wireless connection by the communication between the host and the portable terminal.

* * * * *